Sept. 1, 1970 R. A. FRASCA 3,526,043
AVIATION TRAINER

Filed May 16, 1969 5 Sheets-Sheet 1

INVENTOR
Rudolf A. Frasca
BY
Dominik, Knechtel & Godula
ATTYS.

FIG. 3

Sept. 1, 1970 R. A. FRASCA 3,526,043
AVIATION TRAINER
Filed May 16, 1969 5 Sheets-Sheet 3

INVENTOR
Rudolf A. Frasca
BY
Dominik, Knechtel & Godula
ATTYS.

INVENTOR
Rudolf A. Frasca

BY
Dominik, Knechtel & Godula
ATTYS.

FIG. 8

3,526,043
AVIATION TRAINER
Rudolf A. Frasca, 606 S. Neil St.,
Champaign, Ill. 61820
Continuation-in-part of application Ser. No. 714,671,
Mar. 20, 1968. This application May 16, 1969, Ser.
No. 825,191
Int. Cl. G09b 9/08
U.S. Cl. 35—12                          26 Claims

ABSTRACT OF THE DISCLOSURE

A stationary trainer having a multi-engine computer incorporated into it, so that the trainer can be used to simulate and to teach the principles of flying multi-engine aircraft. In the disclosed embodiment, the multi-engine aircraft simulated is a twin-engine aircraft, however, by duplicating equipment, the trainer can be adapted to simulate the operation of aircraft having four or more engines as well.

---

This application is a continuation-in-part of copending application, Ser. No. 714,671, filed Mar. 20, 1968, entitled "Aviation Trainer."

In U.S. Pat. 3,378,938, there is disclosed an aviation trainer which is primarily mechanically operated and essentially constitutes a miniature airplane which simulates flight conditions by displaying appropriate readings on instruments in the cockpit of the trainer. During operation, the trainer sits immovable upon a solid surface and simulates flight conditions solely by reference to the instruments on the instrument panel. The trainer is rather sophisticated and includes apparatus which is designed to realistically simulate most of the actual flight characteristics of an aircraft, including the inherent stability of an aircraft to recover and straighten out on a pre-established level flight attitude when the stick is positioned to momentarily position the elevator at a climb or dive attitude.

In the above-mentioned copending application, there is disclosed another trainer which is generally like the trainer of U.S. Pat. 3,378,938. The trainer of the co-pending application, however, is improved to ideally suit it for high schools, junior colleges, colleges, and military, civilian and overseas flight training operations in teaching the basics of contact and instrument flying for the private pilot, instrument and commercial ratings. The flight characteristics simulate, among other things, the effects of adverse yaw, automatic nose-drop with bank, airspeed drop-off with turn, and realistic control centering. Less than one hour of setup time is required to ready the trainer for operation.

The trainer further includes a model airplane and a horizontal gridboard which aid in instruction in contact flying. A pop-up cover blocks the view of the contact flying references for full instrument flying by the student. In addition, the gridboard serves as a projection screen for programmed instructions.

Another feature of the subject trainer is the provision of a radio navigation console which provides simulation of VOR, ADF, localizer and marker lights. The recorder moves about the console in relation to the heading being flown in the trainer. The track may be adjusted to duplicate the effects of wind. If desired, the recorder can be easily disconnected. The track, furthermore, is visible from the trainer's cockpit, however, a cover can be instantaneously installed to restrict the student's vision of the console, if desired.

A projector/recorder can be provided to allow the student to learn individually, and as rapidly as his talents permit. Accordingly, the trainer can be used on a programmed training course with minimal aid of an instructor.

The various instruments in the trainer include a two-dimensional artificial horizon, directional gyro, altimeter, rate of climb, airspeed, turn and bank, dual tachometer and manifold pressure gauges, gas selector, mixture controls, ignition switches, stall warner, carburetor heat controls, electric trim, ADF, VOR course selector, and a three light marker system to mention a number of them. If desired, a second VOR course selector and station can be provided, for cross-station reference. The second VOR also can be used as a localizer.

The trainer of the present invention again is generally like the trainer disclosed in the subject copending application, however, a multi-engine computer is incorporated into it, so that the trainer can be used to simulate and to teach the principles of flying multi-engine aircraft. In the disclosed embodiment, the multi-engine aircraft simulated is a twin-engine aircraft, however, by duplicating equipment, the trainer can be adapted to simulate the operation of aircraft having four or more engines as well.

The multi-engine computer also can be easily incorporated into the trainer disclosed in U.S. Pat. 3,378,938, so as to provide a multi-engine trainer capable of realistically simulating most of the actual flight characteristics of a multi-engine aircraft, including the inherent stability of the aircraft to recover and straighten out on a pre-established level flight attitude when the stick is positioned to momentarily position the elevator at a climb or dive attitude.

The trainer of the present invention also is of a construction such that the throttle, prop controls and mixture controls can be locked together and the trainer then used to simulate the flight characteristics of a single engine aircraft. Accordingly, this feature obviously provides expanded use and greater versatility to the trainer. In addition, the trainer is particularly adapted to instruct students engine failure procedures, restart procedures and the effects of $V_{mc}$, that is, the minimum control speed at which it is possible to recover control of the aircraft with an engine inoperative and maintain straight flight.

It is therefore an object of the present invention to provide an improved multi-engine aviation trainer for simulating the flight characteristics of an aircraft.

It is a further object to provide a multi-engine computer which can be easily incorporated into existing aviation trainers, with only a few modifications to the latter.

Still another object is to provide an improved multi-engine aviation trainer which relies primarily upon mechanical linkages and thus is highly reliable, resistant to damage and virtually maintenance-free.

A still further object is to provide an improved multi-engine aviation trainer capable of simulating flight conditions which is easily transportable and can be readily moved about without elaborate preparations or installation problems.

Still another object is to provide an improved multi-engine aviation trainer which is particularly adapted for instructions in engine-out procedures.

A still further object is to provide an improved multi-engine aviation trainer which is adapted to be used to simulate flight conditions of a single engine aircraft.

Still another object is to provide an improved multi-engine aviation trainer which is adapted to simulate $V_{mc}$ effects.

Other objects of the invention will in part be obvious and will in part appear hereinafter.

The invention accordingly comprises the features of construction, combination of elements, arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings, in which.

Similar reference characters refer to similar parts throughout the several views of the drawings.

Figure 1:
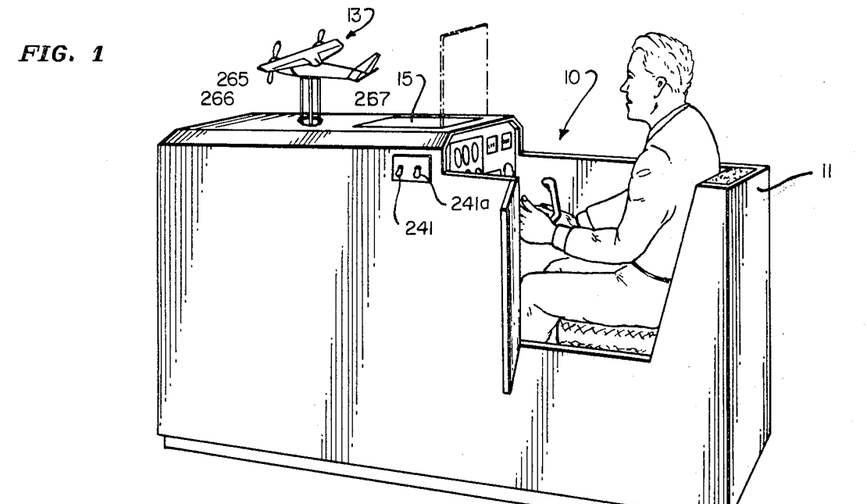
FIG. 1 is a perspective view of an aviation trainer exemplary of the present invention.

Referring now to the drawings, in FIG. 1 a stationary aviation trainer 10 is shown incorporating a fuselage 11 having space provided therein for seating a pilot trainee in a position where he can readily operate the various controls. The trainer is further designed so that a hood (not shown) can be placed over the cockpit of the trainer to eliminate any distractions for the trainee, allowing him to concentrate his attention on the instruments and controls. A radio navigation console (not shown) can be affixed to one side of the fuselage 11, to provide simulation of VOR, ADF, localizer and marker lights in a manner described in the above-mentioned co-pending application, Ser. No. 714,671.

Affixed atop the fuselage 11 in front of the cockpit of the trainer is a model airplane 13 to aid in instructing the pilot trainee, in contact flying. A pop-up cover 15 also is hingedly affixed atop the fuselage 11 and can be used to block the view of the model airplane 13 for full instrument flying by the pilot trainee.

Figure 2:
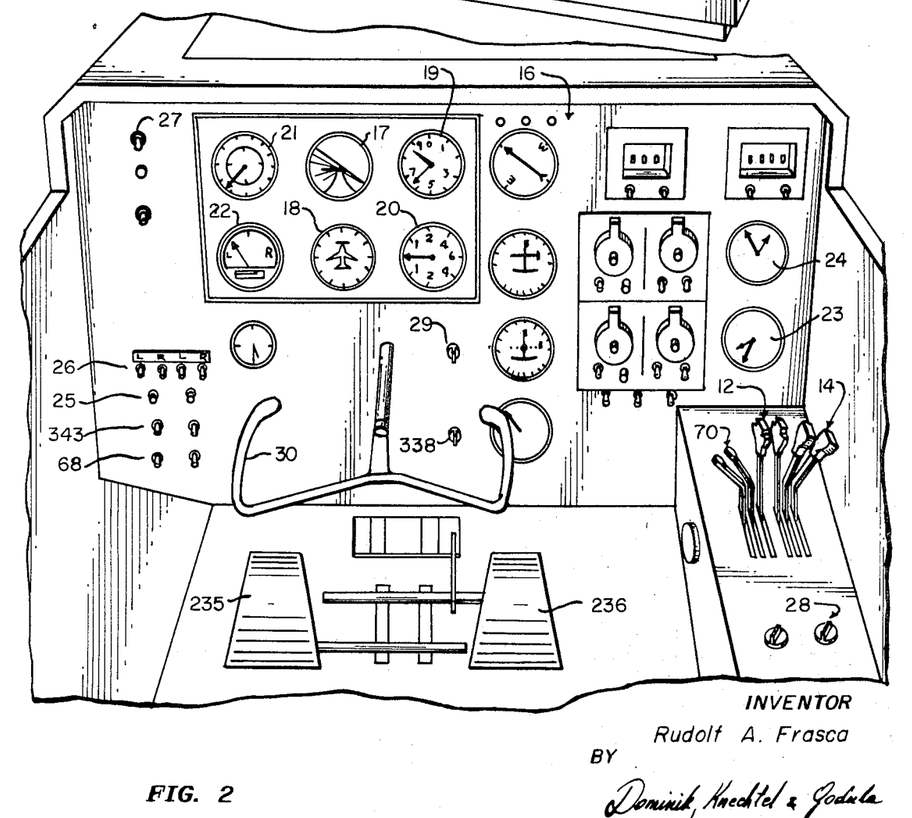
FIG. 2 is a partial perspective view of the aviation trainer of FIG. 1, illustrating its instrument panel.

The cockpit of the trainer includes a control wheel 30, rudder pedals 235 and 236, a small console supporting the throttles 70, the prop controls 12 and the mixture controls 14 for the twin engines, and an instrument panel 16. Mounted on the instrument panel 16 are an artificial horizon 17, a directional gyro 18, an altimeter 19, a rate of climb indicator 20, an airspeed indicator 21, a turn and bank indicator 22, a tachometer 23, a manifold pressure inidcator 24, starter switches 25, magneto switches 26, a master switch 27, carburetor heat controls 28, an electric elevator trim control 29, an electric rudder trim control 338, fuel pump switches 343 and generator switches 68. Appropriate navigation equipment such as radios, an ADF indicator, a VOR course selector, and a marker light system also are provided. The trainer 10 is flown by means of the control wheel 30, the rudder pedals 235 and 236 and the throttles 70, in the manner fully described below.

Figure 3:
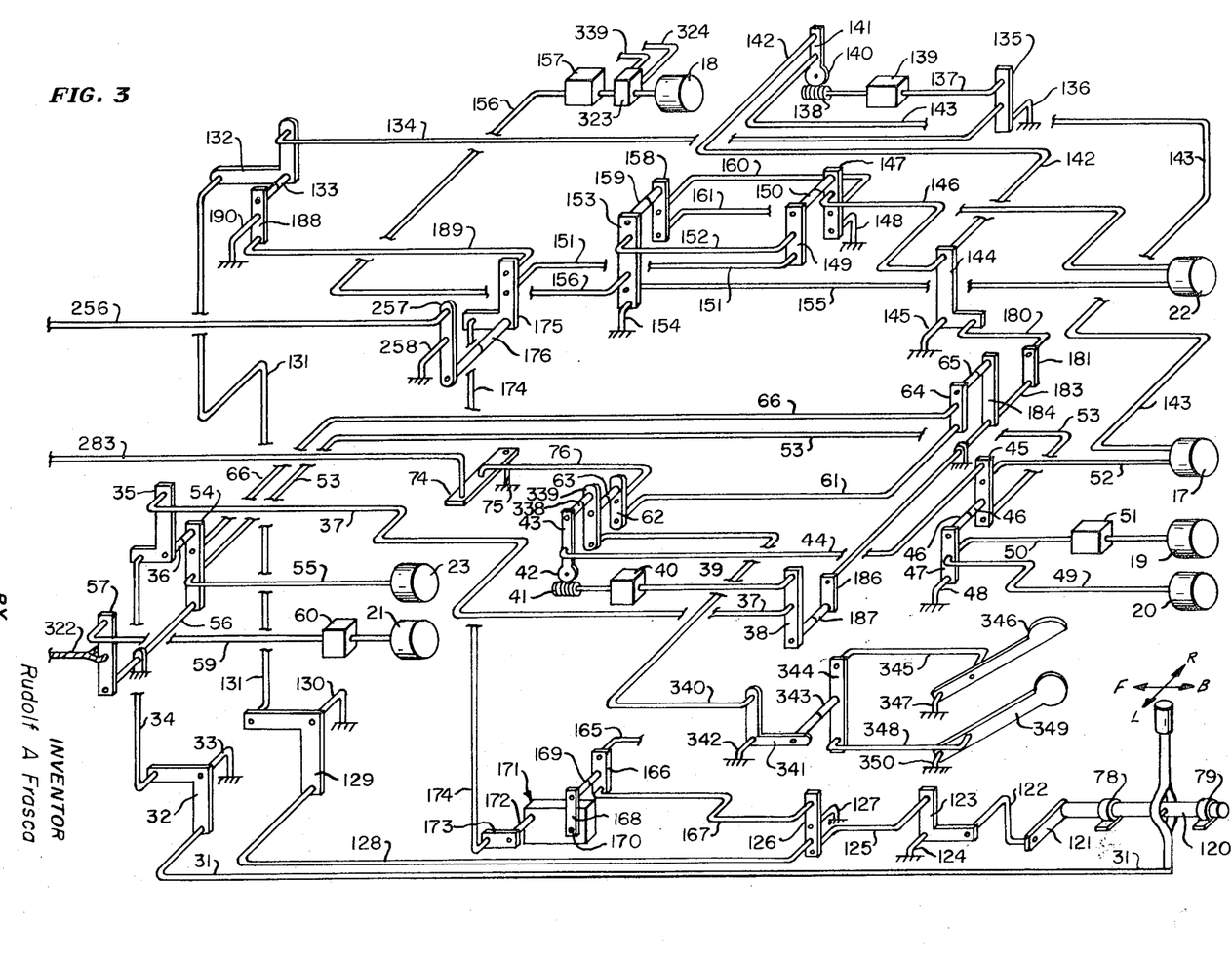
FIG. 3 is a schematic representation of the controls used in the trainer with linkages and operating members shown connecting the controls to the instruments.

In FIG. 3 there is shown a diagrammatic representation of the various flight controls, the instrument panel instruments and the various connections and linkages therebetween, of the trainer. The control wheel 30, for purposes of illustration, is shown as a control stick which is pivotally mounted by means of a pin 77 on a rod 120. The rod 120 in turn is journaled in bearings 78 and 79. Movement of the control stick 30 results in a change in the reading on various instruments by means of mechanical connection. For reference purposes, directions have been indicated above the control stick 30 representing movements of the stick in four directions in which "L" stands for left movement, "R" for right movement, "F" for forward movement, and "B" for backward movement.

If the control stick of an aircraft is moved forward, and then returned to a neutral position, it is expected that the aircraft will assume a nose down, or diving attitude and that the airspeed of the aircraft will increase. Also, the altimeter, the rate of climb and the artificial horizon indicator will likewise indicate the change in the aircraft's attitude. The instruments will indicate a return to straight and level flight, after the control stick is returned to the neutral position. These changes are simulated and indicated on the trainer's instruments, as described below. In moving the control stick 30 forward, the connecting rod 31 is caused to move to the right and thereby cause lever arm 32 to rotate counter-clockwise (CCW) about its anchor 33. This rotational movement of lever arm 32 pulls connecting rod 34 down, which action, in turn, causes the lever arm 35 to rotate CCW about coupler 36. CCW rotation of lever arm 35 pulls connecting rod 37 to the left, causing lever arm 38 to rotate CCW about coupler 187 and move shaft 39 of ball disc integrator 40. Forward movement of shaft 39 results in CCW rotation of worm gear 41 and CCW rotation of wheel gear 42, and hence movement of lever arm 43 to the left. This action, in turn, causes lever arm 339 to rotate CCW about the end of the connecting rod 340 which is held fixed at this time. This rotation of the lever arm 339 causes the lever arm 62 to rotate CCW about the end of the connecting rod 76 which also is held fixed at the time. This causes the connecting rod 61 to move to the right which movement, in turn, causes the lever arm 64 to rotate CCW about the coupler 65. The connecting rod 66 thereby is caused to move to the right to, in turn, cause the lever arm 54 to rotate along with the shaft 56 in a CW direction. This rotation of the lever arm 54 causes the connecting rod 55 to move to the right which movement, in turn, causes the tachometer 23 to indicate an increase in engine r.p.m. The shaft 56 in rotating CW causes lever arm 57 to rotate CW to, in turn, cause lever arm 59 to move to the right, which action is translated by an airspeed lag system 60, to cause the airspeed indicator 21 to indicate an increase in airspeed.

Lever arm 43 in moving to the left also causes the connecting rod 44 to move to the left. This movement combined with the movement of connecting rod 53 which is being moved to the right by the CW rotation of the lever arm 54, causes the lever arm 45 to both move to the left and rotate CCW about the coupler 46, since the magnitudes of the two motions are not equal.

Lever arm 47 thereby is caused to rotate CCW about its anchor 48 and pull connecting rod 49 to the left. The rate of climb indicator 20 is adjusted to indicate that the airplane is descending. Connecting rod 50 also is pulled to the left and the output of the integrator 51 is such as to cause the altimeter 19 to indicate that the altitude of the airplane is decreasing.

Lever arm 45 also pulls the connecting rod 52 to the left as it moves laterally, and connecting rod 52 causes the artificial horizon 17 to indicate that the airplane is descending. Lever arm 54 in rotating CW also moves lever arm 35 to the right, in turn, move connecting rod 37 to the right. Connecting rod 37 in moving to the right causes the lever arm 38 to rotate CW about connecting rod 187. The shaft 39 of the ball disc integrator 40 is moved to the right which movement results in a CW rotation of worm gear 41 and CW rotation of wheel gear 42, and hence, movement of lever arm 43 to the right. This action, in turn, causes connecting rod 44 to move to the right, to cause lever arm 45 to both move to the right and to rotate CW about coupler 46. Lever arm 47 thereby is caused to rotate CW about its anchor 48 and pull connecting rod 49 to the right. The rate of climb indicator 20 is adjusted to indicate that the airplane is leveling out. Connecting rod 50 also is pulled to the right and the output of the integrator 51 is such as to cause the altimeter 19 to indicate that the attitude of the airplane is now stable.

Lever arm 45 also pulls the connecting rod 52 to the right as it moves laterally and pulls connecting rod 53 to the left as it rotates. Connecting rod 52 causes the artificial horizon 17 to indicate that the aircraft is in level flight. Connecting rod 53 in moving to the left causes the lever arm 54 to rotate CCW about connecting rod 56, which action, in turn, causes connecting rod 55 to move to the left. Tachometer 23 thereby is caused to indicate a decrease in engine r.p.m.

Connecting rod 56 is rotated CCW and causes lever arm 57 to rotate CCW, and this rotation causes lever arm 59 to move to the left, which action is translated by the airspeed lag system 60, to cause the airspeed indicator 21 to indicate a decrease in airspeed. Accordingly, it can be seen that connecting rod 66 forms a feed back loop for operating the instruments to cause them to reflect the attitude of the aircraft in accordance with the airspeed for which it is trimmed.

If the control stick of an aircraft is moved right or left, it is expected that the aircraft would bank to the right or left, depending upon the direction in which the control stick is moved. It is also expected that the aircraft would assume a nose down attitude. A slight backward movement of the control stick is generally applied to compensate for the nose drop, to maintain level flight, and when so applied it is found that the airspeed generally decreases slightly as a result of the bank.

Whenever the ailerons of an actual aircraft are deflected from their centered positions, the nose of the aircraft tends to swing in the opposite direction because of aileron drag. This is generally referred to as adverse yaw. In order to perform a coordinated turn, the rudder must be used to bring the tail of the aircraft around to the proper direction of the turn. In most light aircraft, right aileron and the proper amount of right rudder is required to perform a coordinated turn to the right. Correspondingly, left aileron and left rudder are required to perform a coordinated turn to the left. When rolling out of a turn, that is, returning the aircraft to straight and level flight, the use of left aileron and left rudder must be coordinated, if the turn was to the right. Right aileron and right rudder, of course, are coordinated when rolling out of a turn to the left.

These expected results are simulated on the instruments of the triner 10, as follows. When the control stick 30 is moved to the left, the control rod 120 will be rotated with a corresponding movement and will, in turn, rotate the lever arm 121 CCW. Lever arm 121, in turn, moves the connecting rod 122 downward, and this action causes the lever arm 123 to rotate CW about its anchor 124. Connecting rod 125 is moved to the right by this movement of the lever arm 123, and causes the lever arm 126 to rotate CCW about its anchor 127. Lever arm 126 in rotating CCW about its anchor 127 moves connecting rod 167 to the left. This movement of the connecting rod 167 causes the lever arm 166 to rotate CW about the end of connecting rod 165. This CW rotation of lever arm 166, in turn, causes the coupler 169 and the lever arm 168 to move to the left and the lever arm 168 to rotate CCW. The input shaft 170 of the adverse yaw system 171 is thereby caused to rotate in CCW direction. Its output shaft 172 and the lever arm 173 affixed to it are thereby caused to rotate in a CCW direction. This rotation of the lever arm 173 causes the connecting rod 174 to move downwardly, which action, in turn, causes the lever arm 175 to rotate in a CCW direction, about the coupler 176. Connecting rod 151 thereby is caused to move to the left which action causes the lever arm 149 to rotate CW about the coupler 150. This CW rotation of the lever arm 149 moves the connecting rod 152 to the left. This movement of the connecting rod 152 causes the lever arm 153 to rotate CCW about its anchor 154. The CCW rotation of the lever arm 153 moves the connecting rod 155 to the left to, in turn, cause the needle of the turn and bank indicator 22 to move to the right. This CCW rotation of the lever arm 153 causes the lever arm 158 to rotate CCW about the end of the connecting rod 160. The connecting rod 161 thereby is caused to move to the right which movement causes the ball of the turn and bank indicator 22 to move to the left.

Lever arm 126 in rotating CCW also moves connecting rod 128 to the right which, in turn, causes lever arm 129 to rotate CCW about its anchor 130 and pull connecting rod 131 downwardly. Connecting rod 131 is connected to the lever arm 132 and causes it to roate CCW about coupler 133. Connecting rod 134 is moved to the left and, in turn, causes lever arm 135 to rotate CCW about its anchor 136. This rotation of the lever arm 135 causes forward movement of the shaft 137 (to the left) which movement results in CW rotation of worm gear 138 of the ball disc integrator 139 and CW rotation of wheel gear 140. Lever arm 141 and connecting rods 142 and 143 causes the artificial horizon 17 to indicate a bank to the left, as expected. Connecting rod 142 causes lever arm 144 to rotate CW about its anchor 145. Connecting rod 146 is moved to the right, and causes lever arm 147 to rotate CW about its anchor 148. Lever arm 149 is coupled to lever arm 147 by coupler 150 and is caused to both move to the right and to rotate CW about connecting rod 151. This movement of the lever arm 149 moves the connecting rod 152 to the right which action, in turn, causes lever arm 153 to rotate CW about its anchor 154. Connecting rod 155 thereby is moved to the right and this action, in turn, moves the needle of the turn and bank indicator to indicate a turn to the left.

Connecting rod 156 connected to the lever arm 153 also is moved to the right, and this movement is translated by the integrator 157 to cause the directional gyro 18 to indicate a heading change, as a result of a left turn or bank.

The lever arm 158 is coupled to the lever arm 153 by coupler 159, and connecting rod 160 connects the lever arm 158 to the lever arm 147. The connecting rod 160 is moved to the right when the lever arm 147 is caused to rotate CW about its anchor 148, as described above. This action tends to cause the lever arm 158 to rotate CCW about coupler 159 to, in turn, cause connecting rod 161 to move to the right. Lever arm 158, however, also is moved forward (to the right) by the lever arm 153 as the latter is caused to rotate CW about its anchor 154 so that the movement of the connecting rod 161 to the right is only a slight movement. Connecting rod 161 is coupled to the ball of the turn and bank indicator 22 and causes the ball thereof to indicate a slip.

This slip is corrected by applying left rudder. In doing so, connecting rod 165 is moved to the right and, in turn, causes the lever arm 166 to rotate CW about connecting rod 167. Lever arm 168 coupled by coupler 169 to the lever arm 166 is caused to rotate CW about input shaft 170 of the adverse yaw system 171 which action, in turn, causes the output shaft 172 thereof and lever arm 173 affixed to it to rotate CW. Connecting rod 174 is moved upwardly and, in turn, causes lever arm 175 to rotate CW about coupler 176. CW rotation of lever arm 175 moves connecting rod 151 to the right which movement, in turn, causes the lever arm 149 to rotate CCW about coupler 150. This CCW rotation of the lever arm 149 moves connecting rod 152 to the right so that the lever arm 153 is caused to rotate CW about its anchor 154. Connecting rod 160 is held fixed at this time so that the lever arm 158 is caused to rotate CW about the connecting rod 160. This action causes connecting rod 161 to move to the left, to cause the turn and bank indicator to indicate a proper turn. That is, a slip no longer is indicated. Too much rudder, however, will cause a skid, as is well-known, and this also will be indicated if it occurs.

When the lever arm 144 is caused to rotate CW about its anchor 145, in the manner described above, connecting rod 180 is moved to the left. This action causes lever arm 181 to rotate CCW with connecting rod 183 which is fixed and can only rotate. Lever arm 184 affixed to the connecting rod 183 is rotated CCW and causes lever arm 64 coupled to it by coupler 65 to rotate CCW about the end of connecting rod 61. Lever arm 186 affixed to the connecting rod 183 also is caused to rotate CCW to cause the lever arm 38 to rotate CCW about the end of the connecting rod 37 which is held fixed at this time. This movement of the lever arm 38 moves the shaft 39 of the integrator 40 to the left, which movement is in the same direction that the shaft 39 is moved when the control stick 30 is moved forward, as described above. Accordingly, the artificial horizon 17, altimeter 19 and rate of climb indicator 20 all are caused to indicate that the aircraft is descending slowly, in a nose-down attitude.

When the control stick 30 is pulled backward to compensate for the nose drop, the connecting rod 31 moves to the left and, in turn, causes the lever arm 32 to rotate CW about its anchor 33. This rotational movement of lever arm 32 pushes connecting rod 34 upward, which action, in turn, causes the lever arm 35 to rotate CW about coupler 36. This CW rotation of lever arm 35 pushes connecting rod 37 to the right, causing lever arm 38 to rotate CW about the coupler 187. This rotation of the lever arm 38 moves the shaft 39 of the integrator 40 to the right, or in the opposite direction in which it is moved when the control stick 30 is moved forward. The readings on the artificial horizon 17, altimeter 19 and the rate of climb indicator 20 therefore all are adjusted to indicate the change in attitude.

There will be a slight adjustment in the airspeed through the operation of the lever arms 54 and 57, the connecting rods 56 and 59, and the airspeed lag system 60, when the control stick 30 is moved backward to compensate for the nose drop. A slight decrease in airspeed should result.

Lever arm 188 provides a yaw input to bank, to simulate the effect of applying rudder without applying bank. For example, if the left wing is low, an aircraft will tend to bank or turn to the left. The left wing can be brought up, for straight and level flight, by applying right rudder. In FIG. 3, when banking to the left, connecting rod 134 will be moved to the left. When right rudder is applied, connecting rod 174 will be pulled down, by the action of the adverse yaw system 171, to cause lever arm 175 to rotate CCW about coupler 176. This, in turn, moves connecting rod 189 to the left which movement causes lever arm 188 to rotate CW about its anchor 190. This movement, in turn, moves lever arm 132 to the right. Connecting rod 134 likewise is moved to the right, or in the opposite direction as it is moved when banking to the left. Hence, the left wing effectively is raised. In this same manner, a heading may be maintained, using rudder.

When the throttle of an aircraft is operated to change the airspeed of the aircraft, there is generally some change in the aircraft's attitude. These changes in the attitude of the aircraft which are normally expected to occur when the throttle is advanced, or retracted, are simulated with the trainer 10.

If the throttles of the trainer are advanced, without movement of its control stick or rudder pedals, the trainer's instruments should indicate an increase in airspeed and some gaining in altitude. Also, the tachometers should indicate an increase in r.p.m., and the artificial horizon should show a nose high attitude. After the initial gain in airspeed, the airspeed should tend to stabilize at its trim speed and there should be a continuing increase in altitude. The trainer's instruments actually indicate these expected changes in their readings or indication, in the manner described below.

Figure 5:
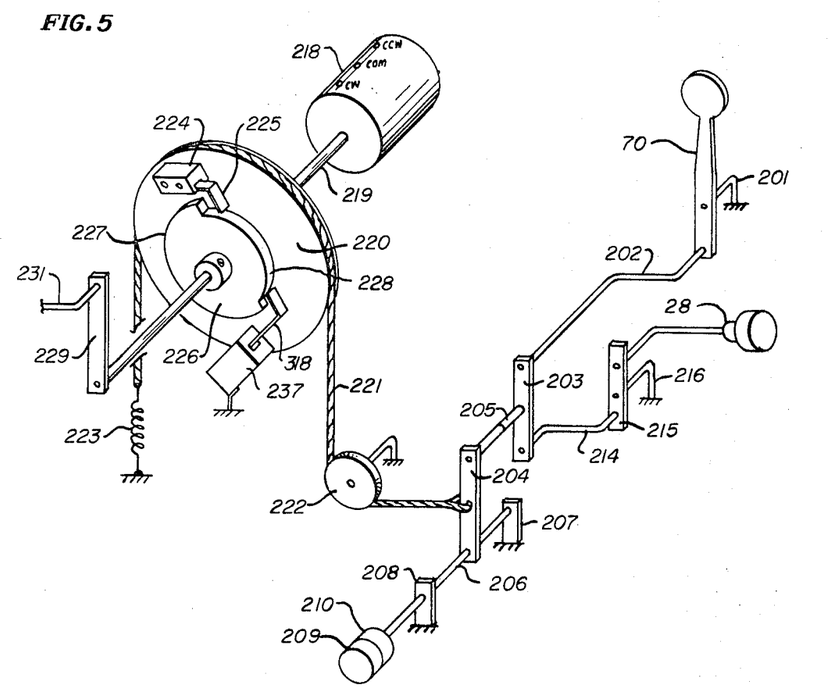
FIG. 5 is a partial perspective view illustrating the motor and controls associated with it, for operating the throttle associated with one of the twin engines of the trainer.

The throttle arrangements can be more clearly understood by referring first to FIG. 5 wherein the throttle arrangement for one engine, in this case, the right engine, is illustrated. The throttle 70 is pivotally affixed to an anchor 201, and its lower end is coupled to a lever arm 203, by means of connecting rod 202. The lever arm 203 is connected by means of the coupler 205 to the lever arm 204, and the latter is fixedly secured to a shaft 206 which is anchored and rotatably supported by the anchors 207 and 208. The shaft 206 is coupled to a pair of potentiometers 209 and 210 which are electrically coupled to and operate the manifold pressure indicator 24 and the engine r.p.m., respectively.

The lever arm 203 also is coupled by a connecting rod 214 to a lever arm 215 which is pivotally affixed to an anchor 216. The lever arm 215 also is connected to and controlled by the carburetor heat control 28.

A reversible motor 218 having an output shaft 219 is fixedly mounted within the fuselage 11 of the trainer. A pulley 220 is positionably fixedly mounted on the output shaft 219, but is free to rotate thereon. A flexible cable 221 is affixed at its one end to the lever arm 204, and strung about appropriately placed guide pulleys 222 (only one shown), so as to extend about and rotatably drive the pulley 220. The opposite end of the flexible cable 222 is affixed to one end of a spring which is anchored at its opposite end. A microswitch 224 having a contact 225 is fixedly secured to the pulley 220, so as to engage a cam 226 which has two cam surfaces 227 and 228 and which is fixedly secured to and rotated by the output shaft 219 of the motor 218. The microswitch 224 is connected to and controls the direction of rotation of the motor 218, in the manner described below. Another microswitch 230 which functions to feather the prop in a manner described below also is affixed within the fuselage 11 so as to be stationary and so as to engage the cam 226.

With this arrangement, when the throttle 70 is pushed forward to advance it, the throttle is caused to rotate CCW about the anchor 201. This action, in turn causes the connecting rod 202 to move to the right and thereby cause the lever arm 203 to rotate CW about the connecting rod 214 which is held fixed at this time. This CW rotation of the lever arm 203 causes the lever arm 204 to also rotate in a CW direction, and pull the flexible cable 221. The flexible cable 221 causes the pulley 220 to rotate in a CW direction on the output shaft 219, and therey physically angularly displace the microswitch 224 so that its contact 225 is positioned somewhere on the cam surface 228 of the cam 226. The position of the contact 225 on the cam surface 228 is related to the position of the throttle 70, as explained more fully below.

Figure 6:
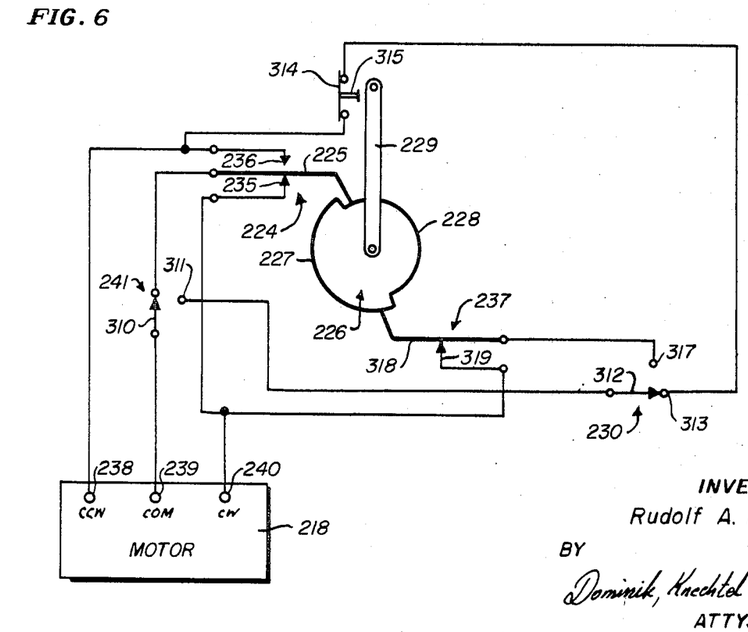
FIG. 6 is a circuit diagram of the electrical circuitry associated with the motor of FIG. 5.

Referring now to FIG. 6 which illustrates the electrical circuitry associated with one of the throttles 70, it can be seen that when the contact 225 of the microswitch 224 is positioned somewhere on the cam surface 228 on the cam 226, the contact 225 engages the contact 235 and a circuit is completed from the comman terminal 239 of the motor 218, through engine-out switch 241, the contacts 225 and 235, to the terminal 240 of the motor. Closing this circuit causes the motor 218 to rotate its output shaft 219 and hence the cam 226 affixed to it in a CW direction. The motor 218 is energized in this manner, until the cam surface 227 on the cam 226 engages the contact 225 and causes the latter to open the above-described circuit and to make contact with the contact 236 of the microswitch. When the contacts 225 and 236 close, a circuit is completed from the common terminal 239 of the motor, through engine-out switch 241, the contacts 235 and 236, to the terminal 238 of the motor. The closing of this circuit causes the motor to rotate its output shaft 219 and hence the cam 226 in the opposite or CCW direction. It can be seen that as soon as the cam 226 is rotated CCW, the contacts 225 and 236 are opened and the contacts 225 and 235 closed, to cause the motor to again rotate in a CW direction. Accordingly, these contacts will be alternately opened and closed, and the motor remains substantially stationary, that is, its output shaft 219 is not rotated, until the pulley 220 again is angularly displaced with respect to the cam 226.

Figure 4:
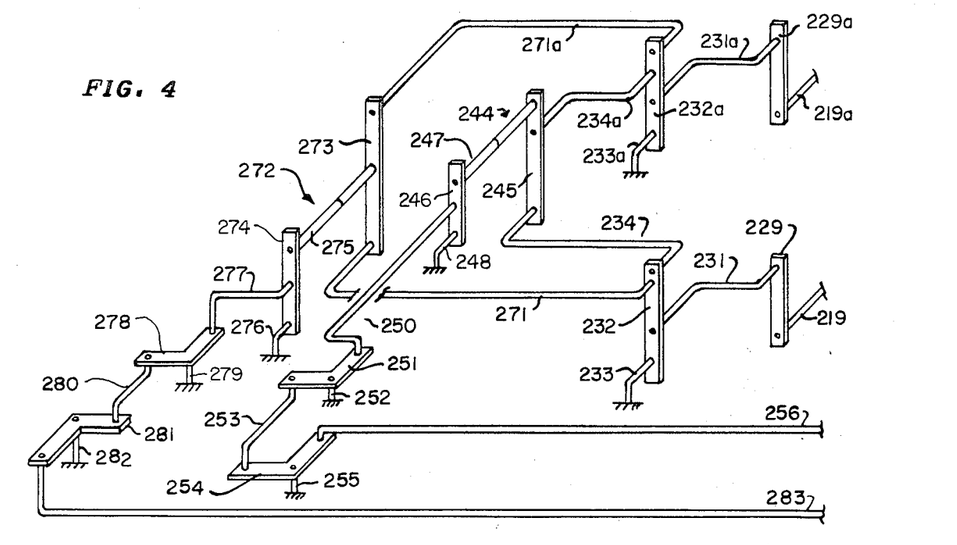
FIG. 4 is a schematic representation of the twin engine computer used in conjuntcion with the linkages and operating members shown in FIG. 3.

When the output shaft 219 is rotated CW in the manner described above, the lever arm 229 likewise is caused to rotate CW. As can be seen in FIG. 4, the lever arm 229 in rotating CW causes the connecting rod 231 to move to the right to, in turn, cause the lever arm 232 to rotate in a CW direction about its anchor 233.

The left engine of the aircraft is simulated in a like fashion, and the output shaft 219a of the motor associated with and operated by its throttle 70 is, of course, caused to rotate in a CW direction to the same extent as the output shaft 219, since both throttles are advanced together a like amount. Accordingly, the lever arm 229a affixed to the output shaft 219a is caused to rotate in a CW direction and this action causes the connecting rod 231a to move to the right. The connecting rod 231a causes the lever arm 232a to rotate in a CW direction about its anchor 233a. It may be noted hat the lever arms 232 and 232a both are coupled by means of connecting rods 234 and 234a, respectively, to the lever arm 245 of the yaw computer 244 which, in addition, includes lever arm 246 which is coupled to the lever arm 245 by means of coupler 247. The lever arm 246 also is anchored by means of anchor 248. The yaw computer 244 computes the difference between the throttle setting of the two engines and provides a corresponding yaw output, which is reflected by the rotation of the lever arm 246. In this respect, there is a 2:1 proportional realtionship established between the connections of the connecting rods 234 and 234a, from the lever arms 232 and 232a to the lever arm 245. This relationship is established so that the lever arm 245 will merely rotate about the coupler 247 when both throttles are simultaneously advanced, or retarded, like amounts. Under these conditions, there should be no yaw output from the yaw computer 244, and it can be seen that such is the case when the lever arm 245 merely rotates about the coupler 247.

If the right throttle 70 is advanced while the left throttle 70a is held fixed, output shaft 219 and hence lever arm 229 is caused to rotate in a CW direction. Connecting rod 231 is moved to the right which action, in turn, causes lever arm 232 to rotate in a CW direction about its anchor 233. This CW rotation of lever arm 232 moves connecting rod 234 to the right, thereby causing lever arm 245 to rotate in a CCW direction about the end of the connecting rod 234a which is held fixed at this time. Lever arm 245 in rotating causes the lever arm 246 to rotate in a CCW direction about its anchor 248. This CCW rotation of the lever arm 246 causes connecting rod 250 which is affixed to it to move to the left to, in turn, cause the lever arm 251 to rotate CCW about its anchor 252. This action causes the connecting rod 253 to move in a fashion such that the lever arm 254 is caused to rotate CCW about its anchor 255. This CCW rotation of the lever arm 254 causes movement of the connecting rod 256 to the left. This movement of the connecting rod 256 ultimately causes the instruments to indicate that the nose of the aircraft is being pulled or pushed to the left. In other words, that the aircraft is yawing to the left. Conversely, if the throttle for the left engine is advanced while the throttle for the right engine is held fixed or retarded, the instructions should indicate a yaw to the right.

For the purpose of explaining the operation of the instruments, assume that the throttle for the right engine is advanced while the left engine's throttle is held fixed or retarded. As described above, the yaw computer 244 computes an output which is reflected by the lever arm 246 which, in the assumed example, will be CCW rotation. This rotation results in movement of the connecting rod 256 to the left which movement, in turn, causes the lever arm 257 to rotate in a CCW direction about its anchor 258. Lever arm 257 in rotating CCW causes coupler 176 and lever arm 175 to move to the right. This movement of the lever arm 175 moves the connecting rod 151 to the right, which movement causes the lever arm 149 to rotate CCW about coupler 150. Connecting rod 152 is caused to move the right which, in turn, causes lever arm 153 to rotate CW about its anchor 154. Lever arm 153 in rotating moves connecting rod 155 to the right which action causes the needle of the turn and bank indicator 22 to move to the left.

Lever arm 153 also causes lever arm 158 to rotate CW about the end of connecting rod 160. This action causes connecting rod 161 to move to the left which action, in turn, causes the ball of the turn and bank indicator to move to the right.

Lever arm 175 in moving to the right causes the lever arm 188 to rotate CCW about its anchor 190. Lever arm 188 in rotating moves the lever arm 132 to the left, which in turn, moves the connecting rod 134 to the left. This movement of the connecting rod 134 causes the lever arm 135 to rotate CCW about its anchor 136. This action moves the input shaft 137 of the integrator 139 to the left and its output shaft and the worm gear 138 is caused to rotate in a CW direction. Wheel gear 140 like-wise is caused to rotate in a CW direction, and this action moves the lever arm 141 to the right. Connecting rods 142 and 143 connected to the lever arm 141 also are moved to the right. The connecting rod 143 causes the artificial horizon 17 to indicate a left bank. The connecting rod 142 in moving to the right, causes the lever arm 144 to rotate CW about its anchor 145. Lever arm 144 in rotating causes the connecting rod 146 to move to the right to, in turn, cause the lever arm 147 to rotate CW about its anchor 148. Lever arm 149 is caused to rotate CW about the end of connecting rod 151. The connecting rod 152 thereby is caused to move to the right to, in turn, cause the lever arm 153 to rotate CW about its anchor 154. Lever arm 153 in rotating CW about its anchor 154, causes the lever arm 158 to rotate CW about the end of connecting rod 161 so that the ball of the turn and bank indicator 22 is not moved to any appreciable extent.

Figure 7:
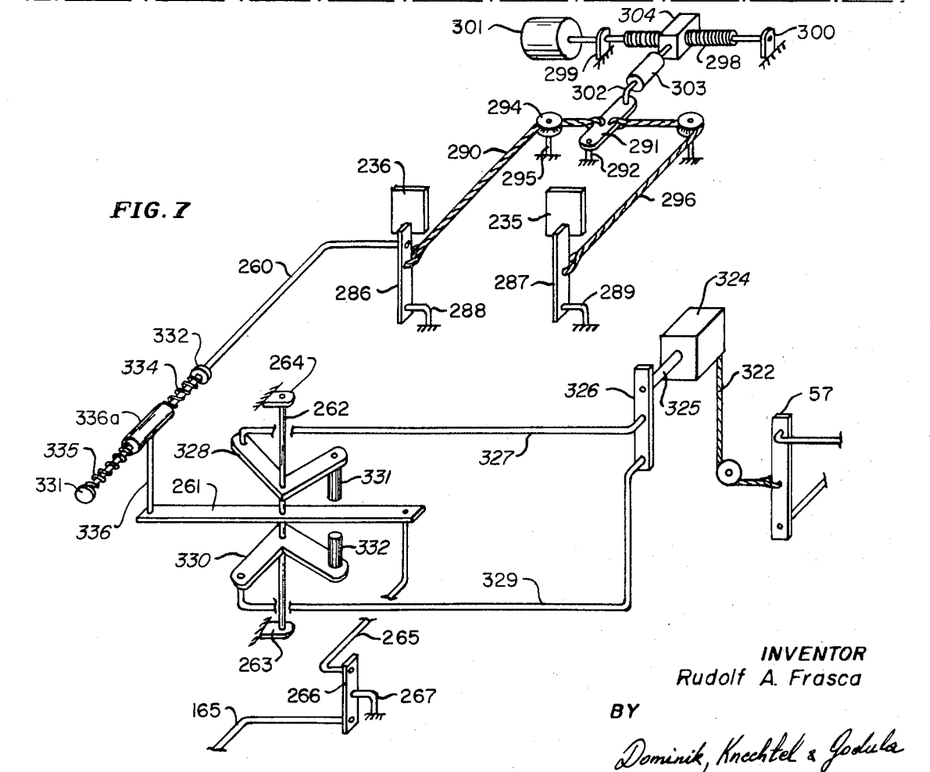
FIG. 7 is a schematic representation of the $V_{mc}$ control of the trainer.

The effect of yaw is compensated for by applying right rudder. As can be seen in FIGS. 3 and 7, in applying right rudder, the compensating rod 260 (FIG. 7) is moved so as to cause the lever arm 261 to rotate in a CCW direction about the shaft 262 which is anchored at each of its opposite ends by anchors 263 and 264. The lever arm 261, in turn, causes the connecting rod 265 to move so as to cause lever arm 266 to rotate in a CW direction about its anchor 267. This rotation of the lever arm 266 moves the connecting rod 165 in a fashion such that the lever arm 166 (FIG. 3) is caused to rotate CCW about the end of the connecting rod 167 which is now held fixed. The CCW rotation of the lever arm 166 causes the coupler 169 and the lever arm 168 to rotate the input shaft 170 of the adverse yaw system 171 in a CCW direction. Output shaft 172 likewise is caused to rotate in a CCW direction to, in turn, rotate the lever arm 173 CCW and pull the connecting rod 174 downwardly. Downward movement of the connecting rod 174 causes the lever arm 175 to rotate CCW about the coupler 176. This rotation of the lever arm 175 causes the connecting rod 151 to move to the left which action, in turn, causes the lever arm 149 to rotate CW about the coupler 150. Lever arm 149 in rotating causes the connecting rod 152 to move to the left too, in turn, cause the lever arm 153 to rotate CCW about its anchor 154. Lever arm 153 rotates the lever arm 158 CCW about the end of the connecting rod 160 which action, in turn, causes the connecting rod 161 to move to the right, bringing the ball back to the center position. The lever arm 153 in rotating CCW about its anchor 154 moves the connecting rod 155 to the left to center the needle of the turn and bank indicator 22. It can therefore be seen that yaw resulting from advancing the right throttle 70 is realistically simulated and furthermore can be compensated for in the trainer 10.

When the throttles 70 and 70a are advanced, there should be an indicated increase in airspeed and a gain in altitude. These effects are reflected, as follows. The lever arms 232 and 232a (FIG. 4) are respectively coupled by means connecting rods 271 and 271a to a lever arm 273 of a power computer 272. This power computer 272 includes another lever arm 274 which is affixed to the anchor 276 and is coupled by means of coupler 275 to the lever arm 273. When both throttles are increased in the manner described above, the connecting rods 271 and 271a are moved to the right, and lever arm 274 is thereby caused to rotate in a CW direction about its anchor 276. Lever arm 274, in turn, moves the connecting rod 277 to move to the right and the lever arm 278 is thereby caused to rotate in a CW direction about its anchor 279. This rotation of the lever arm 278 moves the connecting rod 280 in a fashion such that the lever arm 281 rotates in a CCW direction about its anchor 282, and the connecting rod 283 is moved to the right. This movement, in turn, causes lever arm 74 (FIG. 3) to rotate CCW about its anchor 75. CCW rotation of lever arm 74 moves connecting rod 76 to the right which action, in turn, causes lever arm 62 to rotate CCW about coupler 63. Lever arm 62, in rotating, moves connecting rod 61 to the right, and the connecting rod 61, in turn, causes lever arm 64 to rotate CCW about coupler 65. CCW rotation of lever arm 64 moves connecting rod 66 to the right, which movement is in the same direction in which it is moved when the control stick 30 is moved forward, hence it would be expected that the airspeed indicator and the tachometer will be operated to indicate an increase, as previously indicated. It can be seen that this actually occurs. The connecting rod 66, in this case, causes the lever arm 54 to rotate CW about connecting rod 56. Lever arm 54, in turn, moves connecting rod 55 to the right, to thereby cause the tachometer to indicate an increase in r.p.m. Connecting rod 56 is rotated CW and, in turn, causes lever arm 57 to rotate CW. Connecting rod 59 thereby is moved to the right and this movement is translated by the airspeed lag system 60 and caused to adjust the airspeed indicator 21 to indicate an increase in airspeed. Accordingly, both an increase in airspeed and in engine r.p.m. is indicated, as expected.

The CW rotation of lever arm 54 also moves connecting rod 53 to the right and this movement, in turn, causes lever arm 45 to rotate CCW about connecting rod 44. Lever arm 45, in rotating, moves connecting rod 52 to the right, to cause the artificial horizon 17 to indicate a nose high attitude, as expected. Coupler 46 affixed to the lever arms 45 and 47 causes the lever arm 47 to rotate CW about its anchor 48. This rotation of lever arm 47 moves connecting rods 49 and 50 to the right. Connecting rod 49 causes the rate of climb indicator 20 to indicate that the trainer is climbing, as expected and the movement of the connecting rod 50 is translated by the integrator 51 and caused to adjust the altimeter 19 to indicate an increase in altitude, also as expected. The lever arm 54 in rotating CW moves the lever arm 35 to the right, which action in turn, moves the connecting rod 37 to the right. The connecting rod 37 in moving to the right, causes the lever arm 38 to rotate CW about coupler 187 which action in turn, moves the input shaft 39 of the integrator 40 to the right. The worm gear 41 and the wheel gear 42 are caused to rotate CW, which rotation moves the lever arm 43 to the right. Lever arm 43 in moving to the right causes the lever arm 62 to rotate CW about the end of connecting rod 76. The CW rotation of the lever arm 62 causes connecting rod 61 to move to the left which action, in turn, causes the lever arm 64 to rotate CW about coupler 65. CW rotation of the lever arm 64 moves the connecting rod 66 to the left and this, in turn, causes the lever arm 54 to be rotated in a CCW direction, about the connecting rod 56. This CCW rotation of lever arm 54 adjusts the airspeed of the aircraft back to what it is trimmed at.

Referring again to FIG. 5 and the carburetor heat control 28, when carburetor heat is added, there generally is a decrease in engine r.p.m. The effect is like decreasing the throttle. In the disclosed arrangement, carburetor heat is applied by moving the carburetor heat control 28 to the right. This movement causes lever arm 215 to rotate CW about its anchor 216 to, in turn, cause the connecting rod 214 to move to the left. This movement of the connecting rod 214 causes lever arm 203 to rotate CW about the end of the connecting rod 202 and, in turn, causes the lever arm 204 to rotate in a CCW direction. This movement of the lever arm 204 releases the tension on the flexible cable 221 so that the pulley 220 is angularly adjusted in a fashion such as to reflect a slight decrease in throttle power. The lever arm 204 also causes the shaft 206 to rotate CCW which rotation adjusts the manifold and engine r.p.m. potentiometers 209 and 210 so that the manifold pressure gauge and the engine r.p.m. indicator reflect decreases.

The rudder and trim system for the trainer 10 is illustrated in FIG. 7, and it can be seen that the rudder pedals 235 and 236 each are fixedly secured in spaced relation to lever arms 286 and 287, respectively, and these lever arms are pivotally affixed to anchors 288 and 289. A flexible cable 290 extends about a pulley 294 which is rotatably affixed to an anchor 295, and is affixed at its one end to the rudder pedal 236 and at its other end to a lever arm 291 which is pivotally affixed to an anchor 292. Another flexible cable 296 is similarly affixed to the rudder pedal 235 and the lever arm 291. A piston rod 302 of a hydraulic cylinder 303 is pivotally affixed to the lever arm 291, and the opposite end of the hydraulic cylinder 303 is pivotally affixed to a threaded bracket assembly 304 which has a worm screw gear 298 threadedly extended through it. The worm screw gear 298 is rotatably supported within anchors 299 and 300, and is affixed to and rotatably driven by means of a reversible electric motor 301, in a manner described more fully below.

When the rudder pedal 235, or 236, is operated, the lever arm 291 is caused to pivotally rotate, by being pulled by one or the other of the flexible cables 290 and 296. As the lever arm 291 rotates, the piston rod 302 is pulled from the hydraulic cylinder 303, to thereby exert a pressure on the rudder pedals to simulate the effect of the slipstream on the rudder of an actual aircraft, when the rudder is deflected. The rudder pedals 235 and 236 return to their centered positions when the pressure exerted upon one of them to operate it is released, by the action of the hydraulic cylinder 303.

The rudder trim is activated by means of the trim switch 338 on the instrument panel 16 (FIG. 2). Operation of the trim switch energizes the electric motor 301 to cause the latter to rotate the worm screw gear 298 in a CW or a CCW direction. When the worm screw gear 298 rotates, the threaded bracket assembly 304 is moved to the right or to the left so as to relieve the pressure exerted on the lever arm 291 and hence the rudder pedals, by the hydraulic piston 303. Accordingly, to trim the rudder, the rudder pedals are operated to apply the desired rudder deflection. Thereafter, the trim switch 338 is operated to energize the electric motor 301 to relieve the pressure on the rudder pedal.

As indicated above, the trainer 10 has a model twin engine airplane 13 affixed atop its fuselage 11 which functions to aid in instructing a pilot trainee in contact flying. The model airplane 13 is disposed centrally of the longitudinal length of the trainer, at a height so that the model airplane appears, to the pilot trainee, to be flying toward the horizon. The model airplane 13 is freely pivotally supported atop a pivot pin 265, and has two connecting rods 266 and 267 affixed to it, for changing its bank and pitch attitudes, in accordance with the attitude of an aircraft, as simulated by the trainer 10. A pilot trainee therefore can "fly" the model airplane 13, by reference to it rather than the trainer's instruments, so that he can be instructed in contact flying.

The pop-up cover board 15 can be raised so that it is vertically disposed between pilot trainee and the model airplane so that the view of the latter is blocked, for full instrument flying by the pilot trainee.

As indicated above, the trainer 10 can be used to simulate an engine failure, in order to instruct a pilot on the procedures to follow should such an event occur. The instructor initiates the failure of an engine by operating one of the two engine-out switches 241 and 241a (FIGS. 1 and 6) affixed externally of the trainer's cockpit, on the side of the fuselage 11. These engine-out switches 241 and 241a control the right and left engines, respectively. For purposes of illustration, assume that the instructor operates the engine-out switch 241, to thereby cause failure of the right engine.

Referring to FIG. 6, when the engine-out switch 241 is operated, its contact 310 makes with the contact 311 to close an energizing circuit from the common terminal 239 of the motor 218, through contacts 310 and 311, through contacts 312 and 313 of the feather switch 230, through a normally closed microswitch 314, to the terminal 238 of the motor 218. When this energizing circuit is closed, the motor 218 is caused to rotate its output shaft 219 and hence the cam 226 affixed to it in a CCW direction. This energizing circuit also overrides the operation of the throttle on that engine, so that the output shaft 219 is rotated in a CCW direction until the lever arm 229 engages the contact 315 of the microswitch 314 and operates it to open the circuit. In this position, the engine is "dead."

In FIG. 4, it can be seen that when the lever arm 229 is rotated in a CCW direction, the connecting rod 231 is moved to the left and causes the lever arm 232 to rotate in a CCW direction about its anchor 233. This rotation of the lever arm 232 causes both of the connecting rods 234 and 271 to move to the left.

The connecting rod 234 causes the lever arm 245 of the yaw computer 244 to rotate in a CCW direction about the end of connecting rod 234a which is held fixed at this time. This CCW rotation of the lever arm 245 causes the lever arm 246 to rotate in a CW direction about its anchor 248. It may be recalled from the description above that when the output of the yaw computer 244 resulted in an instrument indication of a yaw to the left, this was initially reflected by the lever arm 246 rotating in a CCW direction about its anchor 248. Accordingly, when the lever arm 246 is caused to rotate in a CW direction as it is when the right engine fails, the instruments will be caused to indicate a yaw to the right. This, of course, is the indication which should be observed when the right engine fails. The lever arm 246 in rotating CW moves the connecting rod 250 such that the lever arm 251 is rotated CW and the connecting rod 253 is thereby moved to cause the lever arm 254 to rotate CW. This CW rotation of lever arm 254 moves connecting rod 256 to the right to, in turn, cause lever arm 257 (FIG. 3) to rotate CW about its anchor 258. Lever arm 257 in rotating CW causes coupler 176 and lever arm 175 to move to the left which movement, in turn, causes the connecting rod 151 to move to the left.

There also should be a decrease in airspeed as a result of engine failure. It may be recalled that the lever arm 274 of the power computer 272 was caused to rotate in a CW direction about its anchor 276 when both throttles were advanced. With an engine failure on the right engine, however, as indicated above, the connecting rod 271 is moved to the left while the connecting rod 271a is held fixed. The lever arm 273 therefore is caused to rotate CCW about the end of the connecting rod 271a and this rotation, in turn, causes the lever arm 274 to rotate CCW about its anchor 276. This rotation being in a direction opposite to that in which the lever arm 274 is caused to rotate when the throttles are advanced should and does result in an indication of a loss of airspeed. The instruments also indicate a nose down attitude, as would be expected.

There is often disagreement between experts on the order in which the items of the engine-out procedure is to be accomplished. Accordingly, for a pilot trainee it is best for him to learn and memorize a standard procedure that will be safe and effective. The description below recites, generally, a procedure to follow, however, it by no means is intended to be a complete, fool-proof procedure for all engine-out emergencies.

One of the first steps in an engine-out emergency is to determine which engine has failed. The "dead foot, dead engine" rule-of-thumb is one method which can be used to determine which engine has failed. This rule-of-thumb requires the use of rudder pressure to determine if directional control can be regained. In applying this rule-of-thumb in the instant assumed case where the right engine has failed, if right rudder is applied, directional control will not be regained. Referring to FIG. 7, it is seen that in applying right rudder, the rudder pedal 236 is operated and this action causes lever arm 286 to rotate CCW about its anchor 288 and moves the compensating rod 260 in a manner such as to cause the lever arm 261 to rotate CCW about the shaft 262. The lever arm 261, in turn, causes the connecting rod 265 to move so as to cause lever arm 266 to rotate in a CW direction about its anchor 267. This rotation of the lever arm 266 moves the connecting rod 165 in a fashion such that the lever arm 166 (FIG. 3) is caused to rotate CCW about the end of the connecting rod 167 which is now held fixed. The CCW rotation of the lever arm 166 causes the coupler 169 and the lever arm 168 to rotate the input shaft 170 of the adverse yaw system 171 in a CCW direction. Output shaft 172 likewise is caused to rotate in a CCW direction to, in turn, rotate the lever arm 173 CCW and pull the connecting rod 174 downwardly. Downward movement of the connecting rod 174 causes the lever arm 175 to rotate CCW about the coupler 176. This CCW rotation of lever arm 175 causes the connecting rod 151 to move to the left, the same direction in which it was moved by the output of the yaw computer 244. It therefore can be seen that applying right rudder does not help in regaining directional control, hence "dead foot, dead engine." If left rudder is applied and the heading can be maintained, it can be concluded that the right engine has failed.

Having now determined that the right engine is "out," this should be verified by closing the throttle on that engine and preferably simultaneously advancing the throttle on the remaining engine so that the airspeed is not reduced. If the right engine out condition is verified, the pilot trainee next should feather the prop on the right engine and cut off all power and fuel supply to it. When the throttle 70 is moved to its feather position, the contact 312 (FIG. 6) of the feather switch 230 is caused to make contact with the contact 317. The contact 318 of the microswitch 237 will be positioned at some predetermined arbitrary position on the cam surface 227 of the cam 226, and when the contacts 312 and 317 of the feather switch 230 are closed, a circuit is closed from the common terminal 239 of motor 218, through contacts 310 and 311, through contacts 312 and 317, through contacts 318 and 319, to the terminal 240 of the motor. When this circuit is closed, motor 218 is energized to cause it to rotate its output shaft 219 in a CW direction. Motor 218 will operate until the contact 318 engages the cam surface 228 on the cam 226 and, at this time, the contacts 318 and 319 will open, and thereby open the described energizing circuit. This operation simulates feathering the prop, and no further energization of the motor 218 can occur until the switch 241 is operated to reclose its contacts 309 and 310.

With an engine inoperative, $V_{mc}$ is simulated as follows. When the airspeed is reduced, from the above description, the lever arm 57 is rotated CCW which rotation released the tension on the flexible cable 322. The $V_{mc}$ control (FIG. 7) includes a motor 324 having an output shaft 325. The latter has a pulley which supports a microswitch and a cam which is engaged and operated by the microswitch generally in the same fashion as the pulley 220 and cam 226 affixed to the output shaft 219 of the motor 218, for controlling the motor 324. The flexible cable 322, in this case, extends about one or more guide pulleys 323 and about the pulley supported on the output shaft 325 of the motor 324. When the tension on the flexible cable 322 is released, the pulley is rotated to energize the motor 324 in a fashion such that its output shaft 325 is rotated in a CCW direction.

The output shaft 325 has a lever arm 326 affixed to it, and the latter is coupled to a lever arm 328 by a connecting rod 327 and to another lever arm 330 by a connecting rod 329. These two lever arms 328 and 330 both are rotatably supported on the shaft 262 and have pins 331 and 332 affixed to them respectively in a fashion such that these pins engage the lever arm 261, as described more fully below.

It can be seen that the connecting rods 327 and 329 both are moved by the lever arm 326 as the latter rotates in a CCW direction, in a fashion such as to cause the lever arm 328 to rotate CW and the lever arm 330 to rotate CCW. Accordingly, when the airspeed falls off to the point that the motor 324 of the $V_{mc}$ control is energized in the above manner, the pins 331 and 332 engage the lever arm 261 and prevent the latter from being operated by the rudder pedals 235 and 236. Normally, as the airspeed drops off, more rudder is needed to maintain directional control. However, with the $V_{mc}$ control, when the airspeed falls below the $V_{mc}$ airspeed needed to maintain directional control, the use of additional rudder is ineffective. When the pins 331 and 332 engage the lever arm 261, more rudder pressure, whether right or left rudder, moves the compensating rod 260. The latter, however, has a pair of springs 334 and 335 which bear against a coupler shaft 336a which has the compensating rod 260 extended through it and to which is affixed a connecting rod 336. The latter, in turn, is coupled to and operates the lever arm 261. It can therefore be seen that additional rudder pressure merely moves the compensating rod 260 in a fashion such that one or the other of the springs 334 or 335 is compressed, against the holding action of the pins 331 and 332 on the lever arm 261. Accordingly, directional control cannot be maintained, until an airspeed greater than the established assumed $V_{mc}$ airspeed is established.

The loss of directional control easily can be lost during landing, as a result of a sudden decrease in airspeed due to lowering the landing gear and flaps. To simulate this occurrence, flap control 346 and landing gear control 349 are provided. From the description above, it may be recalled that the lever 43 is moved to the left when airspeed is increased. This movement of the lever 43 caused lever arm 339 to rotate CCW about the end of connecting rod 340 which is held fixed at this time. The lever arm 339, in turn, caused lever arm 62 to rotate CCW about the end of connecting rod 76 which likewise is held fixed at this time. This CCW rotation of lever arm 62 caused the connecting rod 61 to move to the right. This movement of the connecting rod 61, through the various other described linkages, ultimately caused the lever arm 57 to rotate in a CW direction and the instruments to indicate an increase in airspeed.

When the flaps are lowered, it can be seen that the flap lever arm 346 is rotated CCW about its anchor 347, and that this rotation causes the connecting rod 345 to move to the left. This movement of the connecting rod 345 causes lever arm 344 to rotate CCW about the end of the connecting rod 348. The lever arm 344, in turn, causes the lever arm 341 to rotate CW about its anchor 342, which rotation causes the connecting rod 340 to move to the right.

Likewise, when the landing gear is lowered, it can be seen that the landing gear lever arm 349 is rotated CCW about its anchor 350, which rotation caused the connecting rod 348 to move to the left. This movement of the connecting rod 348 causes the lever arm 344 to rotate CW about the end of the connecting rod 345. This rotation, in turn causes the lever arm 341 to rotate CW about its anchor 342, to thereby cause connecting rod 340 to move to the right.

Accordingly, in each case where the flaps are lowered or the landing gear is lowered, the result is to move the connecting rod 340 to the right. This movement of the connecting rod 340 causes the lever arm 339 to rotate CCW about the coupler 338 to, in turn, cause the lever arm 62 to rotate CW about the end of the connecting rod 76. This CW rotation of the lever arm 62 moves the connecting rod 61 to the left, in a direction opposite to that in which it is moved when airspeed is increased. Accordingly, ultimately the lever arm 57 is caused to rotate CCW with the shaft 56 and when the airspeed drops below the $V_{mc}$ airspeed, the motor 324 of the $V_{mc}$ control is energized. At that time, the operation is as described above. The operation of the landing gear and flap controls, of course, also effect the rest of the trainer.

Figure 8:
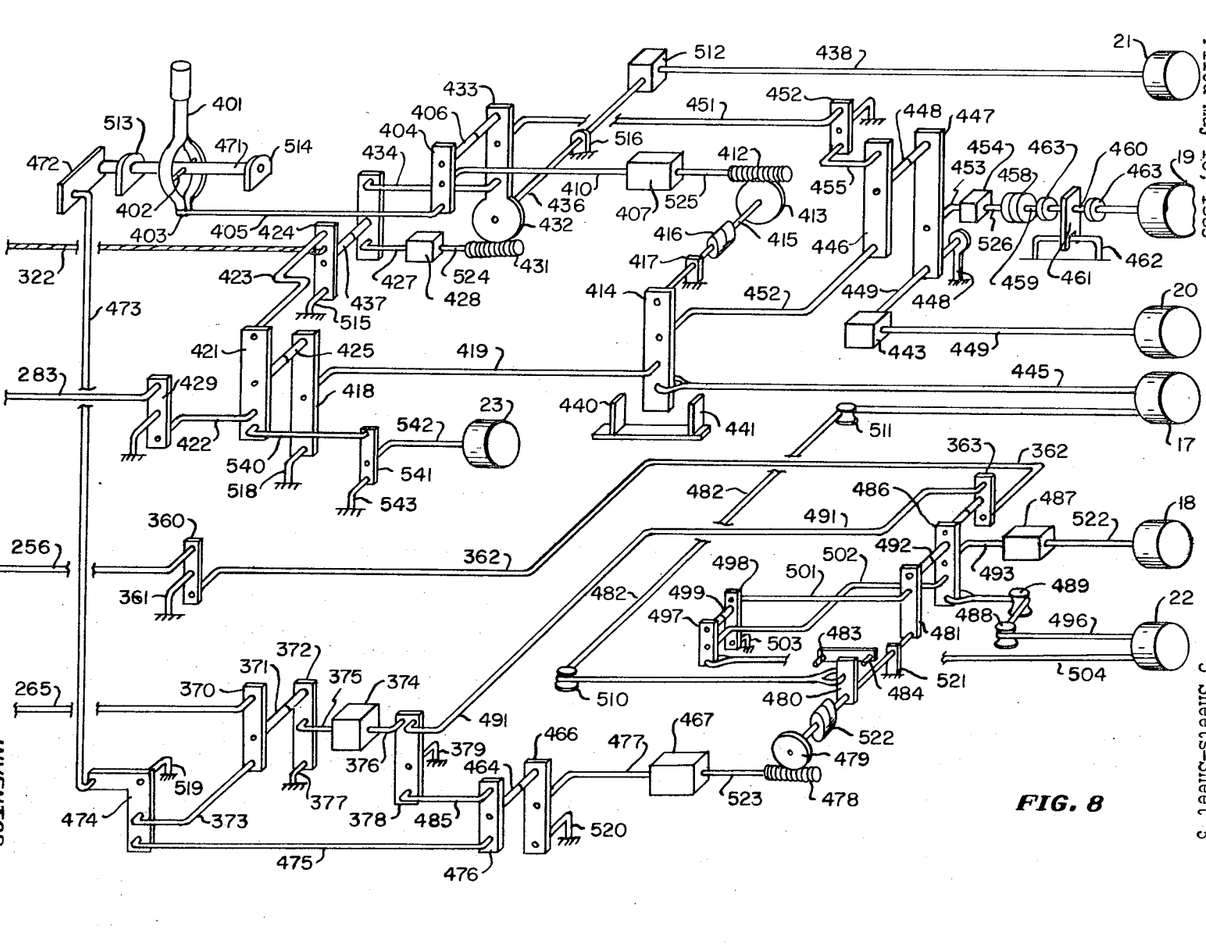
FIG. 8 is a schematic representation of the controls and linkages of another trainer having a phugoid oscillator therein.

Referring now to FIG. 8, a trainer of the type disclosed in the above-mentioned Pat. 3,378,938 is schematically represented, the same having been modified for multi-engine (twin) operation. The same throttle arrangements shown in FIGS. 4–6 and the same $V_{mc}$ control including the rudder and trim system shown in FIG. 7 are used with this trainer. In this trainer, when the control stick is moved forward, the control stick is pivoted on pin 402 resulting in backward movement of the lower end of the control stick 403. The connecting rod 405 and lever arm 404 move backward and at the same time lever arm 404 rotates in a CW direction about the connecting shaft 406. This movement of lever 404 results in backward movement of shaft 410. The backward movement of shaft 410 within the ball disc integrator 407 results in CW rotation of worm gear 412, which causes wheel gear 413, and hence shaft 415, to rotate CCW which, in turn, causes lever arm 414 to rotate CCW. This movement of lever arm 414 relieves the pull on cable 445, which changes the reading of the pitch portion of the artificial horizontal 17 to indicate a nose down, or diving attitude. The CCW rotation of lever arm 414 also causes forward movement of shaft 452 which moves lever arm 446 forward and in a CCW direction about the connecting rod 455. The forward movement of lever arm 446 causes CW rotation of lever arm 447 about connecting shaft 449. CW rotation of lever arm 447 causes the altimeter 19 to indicate that the aircraft is descending, through the medium of connecting rod 453, ball disc integrator 454, slip clutch 458 and the arrangement of shaft 459 having threads 460 thereon, the stop member 461 and the track 462. The rate of climb indicator 20 indicates the rate of descent, through the medium of connecting rod 449; gear box 443 and the connecting rod 449.

Slip clutch 416 will permit wheel gear 413 and shaft 415 to continue to rotate if lever bar 414 reaches either stop member 441 or stop member 440 limiting further travel.

The CCW rotation of lever bar 414 further moves connecting rod 419 forward, causing lever bar 418 to pivot CW about pivot support 518, which movement rotates lever bar 421 in a CW direction about the end of connecting rod 422. The connecting rod 423 is thereby moved forward and this movement of connecting rod 423 moves lever bar 424 in a CW direction, about the anchor 515. Lever bar 424 positions lever bar 426 forward and in a CCW direction about the end of connector rod 434. Lever bar 426 moves forward, which movement causes the output of the ball disc integrator 428 to turn worm gear 431 to rotate wheel gear 432 CW. Wheel gear 432 in rotating CW moves lever bar 433 forward. An increase in airspeed is indicated by the airspeed indicator 21, when wheel gear 432 is rotated to rotate connecting rod 436 coupled to it, which rotation is coupled by gear box 512 to the connecting rod 438 to rotate it in a CW direction. Lever bar 433, in moving forward, causes lever bar 404 to rotate CW about the end of connecting rod 405, to thereby readjust the ball disc integrator 407, so that the airspeed indicator is not operated to show a continuing increase in airspeed.

The above-described changes in the altitude of an actual aircraft when its control stick is moved forward is therefore realistically indicated on the instruments of the trainer.

When the control stick is neutralized, or returned to center position, the lever bar 404 is repositioned and caused to rotate CCW about the connecting shaft 406 to counteract the previous CW rotation that resulted when the connecting rod 405 was moved backward, due to the forward movement of the control stick. CCW rotation of lever bar 404 about the end of connecting rod 406 moves connecting rod 410 forward and this movement adjust ball disc integrator 407, and thereby causes shaft 525 and worm gear 412 to reposition lever bar 414 in the opposite direction. The pitch portion of the artificial horizon 17 is thereby caused to indicate a change in the opposite direction. Also, lever bars 418, 421 424 and 426 are moved to again change the position of lever bar 433 through the ball disc integrator 428. Connecting rod 434 which connects lever bar 433 and lever bar 426 again readjusts the ball disc integrator 428 to establish a dampening, or oscillating, action within the system which operates to influence the pitch portion of the artifical horizon 17 and the altimeter 19 to move up and down, and the airspeed indicator 21 to increase and decrease until gradually settling to a stable position. When lever bar 426 moves CW about the end of connecting shaft 437, shaft 427 is moved forward to reposition the ball portion of the ball disc integrator 428 to one side of the disc thereby causing an output to the roller within the ball disc integrator 428 and to the worm gear 431. Worm gear 431 will rotate wheel gear 432 to move lever bar 433 backward which will, in turn, rotate lever bar 426 CCW, returning the ball portion of the ball disc integrator 428 to the center of the disc cancelling out any other movement to the roller within the ball disc integrator and, therefore, to the worm gear 431. Lever bar 433 will therefore stop rotation and remain fixed until further positioned by the ball disc integrator 428 through worm gear 431. This results in an exponentially-damped oscillation. The output lever bar 433 represents airspeed which increases at a decreasing rate. The foregoing comprises a phugoid oscillation generator which realistically simulates the actual flight characteristics of an aircraft, so that the trainer has the same controllability as the actual airplane itself.

When the two throttles are advanced, the output shafts 219 and 219a of the motors 218 and 218a associated with them are caused to rotate CW, in the manner described above. The lever arms 229 and 229a rotate CW which action, in turn, causes the connecting rods 231 and 231a to move to the right. The lever arms 232 and 232a are thereby caused to rotate CW about their anchors 233 and 233a which, in turn, causes the connecting rods 234 and 234a, and 271 and 271a to move to the right. As described above, when both the connecting rods 234 and 234a are moved to the right together, the lever arm 245 of the yaw computer 244 merely rotates about the coupler 247 so that there is no resulting output from the yaw computer.

The connecting rods 271 and 271a, however, cause the lever arm 273 of the power computer 272 to move to the right which action, in turn, causes the lever arm 274 to rotate CW about its anchor 276. This rotation of the lever arm 274 causes the connecting rod 277 to move to the right and thereby cause the lever arm 278 to rotate CW about its anchor 279. The lever arm 274, in turn, causes the connecting rod 280 to move so that the lever arm 281 rotates in a CCW direction, and the connecting rod 283 moves to the right.

The connecting rod 283 causes lever arm 429 to rotate CW about its anchor to, in turn, cause the connecting rod 422 to move to the left. This movement of the connecting rod 422 causes the lever arm 421 to move backward and in a CW direction, which movement moves lever arm 541 forward and in a CW direction, by means of connecting rod 540. Lever arm 541 in rotating CW moves connecting rod 542 forward which, in turn, causes tachometer 23 to indicate an increase in r.p.m. The movement of lever arm 421 also moves lever arm 424 in a CW direction about anchor 515, by means of connecting rod 423. Lever arm 424 moves lever arm 426 forward and CCW about the end of connecting rod 434. Lever arm 433 is moved forward through the operation of shaft 427, ball disc integrator 428, worm gear 431 and wheel gear 432 to, in turn, move connecting rod 451 so as to rotate lever arm 446 CCW. Lever arm 447 being coupled to lever arm 446 is caused to rotate CCW to, in turn, move connecting rod 453 backward to operate the ball disc integrator 454. The output of integrator 454 by means of slip clutch 458, shaft 459, threads 460, stop member 461 and track 462 causes the altimeter 19 to indicate a slight increase in altitude.

An increase in airspeed is indicated when lever arm 424 rotates CW to, in turn, cause lever arm 426 to move forward and to rotate CCW to move connecting rod 427 forward to operate the ball disc integrator 428. The connecting rod 524 and the worm gear 431 are rotated, which rotation causes wheel gear 432 and shaft 436 to rotate in a CCW direction. The gear box 512 translates this motion to rotate shaft 438 which causes airspeed indicator 21 to indicate an increase in airspeed.

The artificial horizon 17 indicates a slight nose high attitude due to lever arm 404 moving forward. This movement is conveyed through the ball disc integrator 407, shaft 525 and worm gear 412 to the wheel gear 413 to cause it to rotate CW. Lever arm 414 being coupled to the whel gear 413 through shaft 415, slip clutch 416 is caused to rotate CW to pull cable 445 backward, which action is opposite to that previously described when the control stick is moved forward, so that now a nose high attitude is indicated.

It may be further noted that the movement of lever arm 414 is coupled back to the lever arm 421 by means of the connecting rod 419 and lever arm 418. The phugoid oscillation described above therefore occurs. The rate of climb indicator 20, the artificial horizon 17 and the altimeter 19 will all indicate a climbing attitude, as would be expected.

For the purpose of describing the operation of the trainer of FIG. 8 during an engine failure, again assume that the right engine fails. As indicated above, this engine failure is initiated by the instructor operating the engine out switch 241. The motor 218 is again energized and operated in the manner described above, to provide an output from the yaw computer 244 to indicate a yaw to the right. This is indicated by the lever arm 246 rotating CW. This rotation moves the connecting rod 250 such that the lever arm 251 is rotated CW and the connecting rod 253 is thereby moved to cause the lever arm 254 to rotate CW. This CW rotation of lever arm 254 moves connecting rod 256 to the right to, in turn, cause lever arm 360 to rotate CW about its anchor 361. The lever arm 360 in rotating CW moves the connecting rod 362 to the left and this movement, in turn, causes the lever arm 363 to rotate CCW about the end of connecting rod 91. This CCW rotation of the lever arm 363 causes the lever arm 486 to rotate CCW about the end of the connecting rod 502. Lever arm 486 in rotating moves the connecting rod 493 to the left so that the output of the ball disc integrator 487 causes an appropriate change in the heading indicated by the directional gyro 18. Also, the cable 496 is moved so as to cause the turn and bank indicator 22 to indicate a bank to the right.

The lever arm 486 also causes the lever arm 481, the shaft 522 and the lever arm 480 all to rotate CCW. The lever arm 480 moves the cable 482 coupled to the bank portion of the artificial horizon 17, to cause the latter to indicate a bank to the right. The lever arm 481 in rotating CCW moves the connecting rod 501 to the left which movement, in turn, causes lever arm 498 to rotate CCW. This CCW rotation causes the lever arm 497 to rotate CCW about the end of the connecting rod 502. Cable 504 is therefore allowed to move to the right, to indicate a turn to the right. Accordingly, it can be seen that the effects of a right engine failure to cause an aircraft to yaw to the right is realistically simulated.

When the right engine fails, there also is a loss of power and hence loss in airspeed. This loss in airspeed likewise is simulated. Referring again to FIG. 4, when the connecting rod 271 is moved to the left, the lever arm 273 of the power computer 272 is caused to rotate CW about the end of connecting rod 271a which is held fixed at this time. The lever arm 274 is caused to rotate CCW about its anchor 276 to, in turn, cause connecting rod 277 to move to the left. Lever arm 278 is thereby caused to rotate CCW to, in turn, move the connecting rod 280 such that the lever arm 281 is caused to rotate CW. This rotation of the lever arm 281 moves the connecting rod 283 to the left which movement, in turn, causes lever arm 429 (FIG. 3) to rotate CCW about its anchor. It may be recalled from the description above that the lever arm 429 was caused to rotate CW about its anchor when the throttles were advanced, and that the resulting effect was to indicate an increase in airspeed. Accordingly, when the lever arm 429 now is caused to rotate CCW about its anchor, it can be concluded that the resulting effect will be to indicate a decrease in airspeed. This, of course, is the expected result.

In applying the rule-of-thumb "dead foot, dead engine," if right rudder is applied, directional control will not be regained. Referring again to FIG. 7, the operation of the right rudder pedal 236 causes lever arm 286 to rotate CCW about its anchor 288. This rotation, in turn, moves the compensating rod 260 in a manner such that the lever arm 261 is caused to rotate CCW about the shaft 262. The lever arm 261, in turn, causes the connecting rod 265 to move downwardly, or to the left in FIG. 8. The connecting rod 265, in this case, is connected to a lever arm 370 (FIG. 8) rather than to the lever arm 266 (FIG. 7). The lever arm 370 is caused to rotate CCW about the end of connecting rod 373 which is held fixed at this time to, in turn, cause the lever arm 372 to rotate CCW about its anchor 377. The lever arm 372 moves the connecting rod 375 to the left. A lag system 374 provides a momentarily delayed output in the same direction to the connecting rod 376 so that it likewise is moved to the left. This movement of the connecting rod 376 causes the lever arm 378 to rotate CCW about its anchor 379.

This CCW rotation of lever arm 378 moves the connecting rod 491 to the left which movement, in turn, causes the lever arm 363 to rotate CCW about the end of connecting rod 362 which is held fixed at this time. This rotation of the lever arm 363 causes the lever arm 486 to rotate CCW about the end of connecting rod 502, the same direction in which it is initially caused to rotate by the output of the yaw computer 244, as described above. Accordingly, it can be seen that directional control is not regained.

Lever arm 378 in rotating CCW also moves connecting rod 485 to the right to, in turn, cause the lever arm 476 to move to the left and to rotate CW about the end of the connecting rod 475. The lever arm 476 in rotating CW causes the lever arm 466 to rotate CW about its anchor 420 to, in turn, cause the connecting rod 477 to move to the right into the ball disc integrator 467 to thereby cause worm gear 478 to rotate and cause wheel gear 479 to rotate CCW. The shaft 522 coupled to wheel gear 479 likewise rotates and causes lever arms 480 and 481 to rotate in a CCW direction. These lever arms 480 and 481 likewise were caused to rotate in a CCW direction as a result of the output of the yaw computer 244, so that again it can be seen that directional control is not regained. It therefore can be concluded that the right engine has failed.

As indicated above, having determined that the right engine is "out," this should be verified by closing the throttle on that engine and preferably simultaneously advancing the throttle on the remaining engine so that the airspeed is not reduced. If the right engine out condition is verified, the pilot trainee next should feather the prop on the right engine and cut off all power and fuel supply to it. The prop is feathered in the same manner as described above.

$V_{mc}$ also is simulated in the manner described above, when the airspeed falls below the $V_{mc}$ airspeed needed to maintain directional control. In this case, however, the flexible cable 322 (FIGS. 7 and 8) about the pulley (not shown) on the output shaft 325 of the $V_{mc}$ control motor 324 is connected to the lever arm 424 (FIG. 8).

The above-described land gear and flap controls also can be incorporated into this latter described trainer, to more realistically simulate the effects of $V_{mc}$. This is easily accomplished by coupling the connecting rod 340 (FIG. 3) of the land gear and flap controls to the lever arm 404 in FIG. 8. The effects of lowering the landing gear and/or the flaps then will be coupled to the $V_{mc}$ control, when the lever arm 424 is operated, through the above-defined loop forming the phugoid oscillator in the trainer.

The trainer, in addition, is capable of simulating all of the effects of moving the control stick 30, the throttles 70 and/or the rudder pedals 235 and 236 as described above in the case of the trainer of FIG. 3. In addition, both the trainers of FIG. 3 and FIG. 8 can be used to simulate a single engine trainer, simply by locking together the throttles, the mixture controls and the prop controls. When the throttles are locked together, both motors 218 and 218a associated with the throttles are energized simultaneously to rotate their output shafts 219 and 219a. If the throttles are advanced, the rotation of the output shafts 219 and 219a will be in a CW direction. The lever arms 229 and 229a (FIG. 4) are thereby caused to rotate CW and move the connecting rods 231 and 231a to the right to, in turn, cause the lever arms 232 and 232a to rotate CW about their anchors. As indicated above, the connecting rods 234 and 234a are coupled to the lever arm 245 of the yaw computer 244 in a fashion such that the lever arm 245 is caused to merely rotate about the coupler 247 when both throttles are simultaneously advanced a like amount. Accordingly, the lever arm 246 is not caused to rotate and there therefore is no resulting output from the yaw The lever arm 273 of the power computer 272, however, is coupled by means of connecting rods 271 and 271a to the lever arms 232 and 232a and is caused to move to the right when the lever arms 232 and 232a are rotated CW. The lever arm 274 is thereby caused to rotate in a CW direction about its anchor 276, to provide an output which, as described above, causes the instruments to reflect the effects of advancing the throttle.

It will thus be seen that the objects set forth above, among those made apparent from the preceding description, are efficiently attained and certain changes may be made in the above construction. Accordingly, it is intended that all matter contained in the above description or shown in the accompanying drawings shall be interpreted as illustrative and not in a limiting sense.

Now that the invention has been described, what is claimed as new and desired to be secured by Letters Patent is:

1. A stationary aviation trainer for the instruction of pilots comprising, in combination: a fuselage; a control stick; a first and a second throttle, instruments including an airspeed indicator, altimeter, rate-of-climb indicator and an artificial horizon; a first mechanical computer coupled to said control stick and to said airspeed indicator and responsive to movement of said control stick to operate said airspeed indicator to indicate thereon an assumed simulated airspeed reading; a second mechanical computer coupled to said first mechanical computer and to said altimeter to operate said altimeter to indicate thereon an assumed simulated altitude responsive to the operation of said first mechanical computer; means coupling said rate of climb indicator to said second mechanical computer to operate said rate of climb indicator to indicate thereon an assumed climb or descent reading; a feed-back loop including a mechanical integrator and a third mechanical computer coupling an output of said first mechanical computer to an input thereof to operate said first mechanical computer to provide an output to said instruments to cause the readings thereon to oscillate in an exponential decreasing fashion and to stabilize about a reference axis established by the position of the control stick; and a mechanical power computer coupled to said first and said second throttles and to said third mechanical computer for computing and coupling to said third mechanical computer an input which is related to the setting of said first and said second throttles.

2. A stationary trainer, as claimed in claim 1, wherein said feed-back loop further includes a fourth mechanical computer; means coupling said fourth mechanical computer to said artificial horizon to operate said artificial horizon to indicate thereon a simulated assumed attitude reading.

3. A stationary trainer, as claimed in claim 2, further including rudder controls, coupling means including a fifth, sixth and seventh mechanical computer coupling said control stick to said gyro indicator and said turn and bank indicator and operated in response to the movement of said control stick to indicate thereon simulated assumed compass headings and turn and bank readings, respectively, said rudder controls being coupled to said fifth and seventh mechanical computers for operating them to correct the simulated assumed readings indicated on said gyro and said turn and bank indicators.

4. The stationary trainer of claim 3, further including a $V_{mc}$ control included in the coupling between said rudder controls and said fifth and seventh mechanical computers, said $V_{mc}$ control being coupled to and operated by said first mechanical computer to prevent the operation of said rudder controls from correcting the simulated assumed readings indicated on said gyro and said turn and bank indicators.

5. A stationary trainer, as claimed in claim 3, further including a mechanical yaw computer coupled to said first and said second throttles and to said seventh mechanical computer for computing and coupling to said seventh mechanical computer an input which is related to the setting of said first and said second throttles.

6. The stationary trainer of claim 5, further including a $V_{mc}$ control included in the coupling between said rudder controls and said fifth and seventh mechanical computers, said $V_{mc}$ control being coupled to and operated by said first mechanical computer to prevent the operation of said rudder controls from correcting the simulated assumed reading indicated on said gyro and said turn and bank indicators.

7. The stationary trainer of claim 5, further including a reversible motor associated with each of said first and second throttles, each of said motors having an output shaft, a cam fixedly secured to said output shaft having a first and a second cam surface thereon, a pulley rotatably affixed to said output shaft and having a first switch affixed thereto, said first switch having a first and a second terminal contact and a switch contact which is disposed to slidably engage with said cam surface on said cam, a first energizing circuit including said switch contact and said first terminal contact of said first switch for energizing said motor to rotate its output shaft in one direction, a second energizing circuit including said switch contact and said second terminal contact of said first switch for energizing said motor to rotate its output shaft in the opposite direction, said switch contact of said first switch when engaged with said first cam surface closing said first energizing circuit and when engaged with said second cam surface closing said second energizing circuit, a lever arm affixed to and rotated by said output shaft, said lever arm being coupled to said mechanical yaw computer and to said mechanical power computer and upon being rotated providing an input thereto, said first and second throttle being coupled to and operable to rotate said pulley affixed to the output shaft of the motor associated with it to position said switch contact of said first switch affixed to said pulley on one of said first and second cam surfaces to thereby close one of said first and second energizing circuits for said motor to cause it to rotate the lever arm affixed to the output shaft thereof to couple an input to said mechanical yaw computer and said mechanical power computer.

8. The stationary trainer of claim 7, wherein said first and said second throttle is coupled to the pulley associated with it by means of a flexible cable extending about said pulley and having one end thereof resiliently anchored and the other end thereof coupled to said throttle in a fashion such as to rotate said pulley when said throttle is pivotally and rotatably operated.

9. The stationary trainer of claim 7, further including a third energizing circuit for each of said motors associated with said first and second throttles, each of said third energizing circuits being electrically connectable in parallel with the first energizing circuit for said motor, an engine-out switch operable to open said first energizing circuit and to close said third energizing circuit to energize said motor to rotate its output shaft and the lever arm affixed thereto to thereby couple an input to said mechanical yaw computer and said mechanical power computer to simulate an engine failure, a microswitch included in said third energizing circuit and engageable by said lever arm to open said third energizing circuit when said lever arm has rotated to a predetermined engine-out position.

10. The stationary trainer of claim 9, further including a fourth energizing circuit for each of said motors associated with said first and second throttles for energizing said motor to rotate the lever arm affixed to its output shaft to provide an input to said mechanical yaw computer and said mechanical power computer to simulate feathering the prop on the engine which is simulated to have failed, a feather switch operable by said throttle when the latter is operated to a feather position associated with it to close said fourth energizing circuit, and a fixedly mounted second switch included in said fourth energizing circuit, said second switch having a switch contact disposed to engage said first and second cam surfaces on said cam, said switch contact upon engaging a predetermined one of said first and second cam surfaces opening said fourth energizing circuit for said motor.

11. The stationary trainer of claim 3, wherein said rudder controls comprise a right and a left rudder pedal, a compensating rod affixed to and operated by one of said rudder pedals, a rotatably supported lever arm, means coupling said lever arm to said fifth mechanical computer to provide an input thereto from said lever arm, a connecting rod affixed to said lever arm and coupled to said compensating rod, said compensating rod being adapted to rotate said lever arm when said compensating rod is operated by said one of said rudder pedals.

12. The stationary trainer of claim 11, wherein said $V_{mc}$ control includes a reversible motor having an output shaft, a cam fixedly secured to said output shaft having a first and a second cam surface thereon, a pulley rotatably affixed to said output shaft and having a switch affixed thereto, said switch having a first and a second terminal contact and a switch contact which is disposed to slidably engage said cam surfaces on said cam, a first energizing circuit including said switch contact and said first terminal contact for energizing said motor to rotate its output shaft in one direction, a second energizing circuit including said switch contact and said second terminal contact for energizing said motor to rotate its output shaft in the opposite direction, said switch contact when engaged with said first cam surface closing said first energizing circuit and when engaged with said second cam surface closing said second energizing circuit, clamping means operable to restrict the rotational movement of said lever arm, a lever arm affixed to and rotated by the output shaft of said motor coupled to and adapted to operate said clamping means, said first mechanical computer being coupled to and operable to rotate said pulley to position said switch contact of said switch on one of said first and second cam surfaces on said cam to thereby close one of said first and second energizing circuits for said motor, said compensating rod having means thereon for permitting said compensating rod to be operated when said lever arm is prevented from rotating.

13. A stationary aviation trainer for the instruction of pilots comprising a plurality of instruments including an airspeed indicator, an altimeter, a rate of climb indicator and an artificial horizon, a plurality of control means including a control stick, a first and a second throttle, a first mechanical computer coupled to said control stick and to said airspeed indicator, a second mechanical computer coupled to said first mechanical computer and to a mechanical integrator, said second mechanical computer operated in response to the operation of said first mechanical computer to operate said mechanical integrator to provide an output therefrom, said output being coupled to a third mechanical computer which is coupled to and operates said altimeter, said rate of climb indicator and said artificial horizon so as to indicate thereon an assumed simulated altitude, rate of climb or descent and aircraft attitude, respectively, said third mechanical computer also being coupled to and operating said first mechanical computer to operate said airspeed indicator to indicate thereon an assumed simulated airspeed reading, a fourth mechanical computer coupled to and operated by said mechanical integrator, means coupling said fourth mechanical computer to said first mechanical computer forming a feed back loop to operatively adjust said first mechanical computer to operate said plurality of instruments to cause them to reflect the attitude of the aircraft in accordance with the airspeed for which it is trimmed, a mechanical power computer coupled to said first and said second throttles and to said fourth mechanical computer for computing and coupling to said fourth mechanical computer an input which is related to the setting of said first and second throttles.

14. The stationary aviation trainer of claim 13 wherein said means coupling said fourth mechanical computer to said first mechanical computer comprises a connecting rod.

15. The stationary aviation trainer of claim 14, further including a directional gyro, a turn and bank indicator, a fifth mechanical computer coupled to said control stick and to another mechanical integrator, said other mechanical integrator being coupled to said artificial horizon and to a sixth mechanical computer which is coupled to and operates said turn and bank indicator and said directinal gyro to cause said artificial horizon, said turn and bank indicator and said directional gyro to indicate thereon the assumed attitude of the aircraft in accordance with the movement of said control stick.

16. The stationary aviation trainer of claim 15, further including rudder controls coupled to a seventh mechanical computer which is coupled to said fifth and sixth mechanical computers, an adverse yaw system coupled to said rudder controls being operable to operate said seventh mechanical computer to, in turn, operate said fifth and sixth mechanical computers, said fifth mechanical computer operating said other mechanical integrator to cause the latter to operate said artificial horizon and said sixth mechanical computer to operate said turn and bank indicator and said directional gyro to indicate thereon the assumed attitude of the aircraft in accordance with the movement of said rudder pedals.

17. The stationary trainer of claim 16, further including a $V_{mc}$ control included in the coupling between said rudder controls and said seventh mechanical computer, said $V_{mc}$ control being coupled to and operated by said first mechanical computer to prevent the operation of said rudder controls from correcting the simulated assumed readings indicated on said gyro and said turn and bank indicators.

18. The stationary trainer of claim 16, further including a mechanical yaw computer coupled to said first and second throttles and to said seventh mechanical computer for computing and coupling to said fifth mechanical computer an input which is related to the setting of said first and said second throttles.

19. The stationary trainer of claim 12, wherein said control stick is coupled to said seventh mechanical computer and to an adverse yaw system and is adapted to operate said adverse yaw system to provide an output to said seventh mechanical computer, said control stick and said rudder controls further being coupled to said adverse yaw system in a fashion such that no input is coupled to said adverse yaw system when the movement of said control stick and said rudder controls is coordinated.

20. The stationary trainer of claim 14, further including a flap control and a land gear control, a mechanical computer coupling said flap control and said land gear control to said fourth mechanical computer, said mechanical computer being operable responsive to the operation of said flap control and said land gear control to couple an input which is related to the setting of said flap and landing gear controls to said fourth mechanical computer to operate the latter to correspondingly adjust the indicated airspeed.

21. The stationary trainer of claim 18, further including a reversible motor associated with each of said first and second throttles, each of said motors having an output shaft, a cam fixedly secured to said output shaft having a first and a second cam surface thereon, a pulley rotatably affixed to said output shaft and having a first switch affixed thereto, said first switch having a first and a second terminal contact and a switch contact which is disposed to slidably engage with said cam surfaces on said cam, a first energizing circuit including said switch contact and said first terminal contact of said first switch for energizing said motor to rotate its output shaft in one direction, a second energizing circuit including said switch contact and said second terminal contact of said first switch for energizing said motor to rotate its output shaft in the opposite direction, said switch contact of said first switch when engaged with said first cam surface closing said first energizing circuit and when engaged with said second cam surface closing said second energizing circuit, a lever arm affixed to and rotated by said output shaft, said lever arm being coupled to said mechanical yaw computer and to said mechanical power computer and upon being rotated providing an input thereto, said first and second throttle being coupled to and operable to rotate said pulley affixed to the output shaft of the motor associated with it to position said switch contact of said first switch affixed to said pulley on one of said first and second cam surfaces to thereby close one of said first and second energizing circuits for said motor to cause it to rotate the lever arm affixed to the output shaft thereof to couple an input to said mechanical yaw computer and said mechanical power computer.

22. The stationary trainer of claim 21, wherein said first and said second throttle is coupled to the pulley associated with it by means of a flexible cable extending about said pulley and having one end thereof resilientiy anchored and the other end thereof coupled to said throttle in a fashion such as to rotate said pulley when said throttle is pivotally and rotatably operated.

23. The stationary trainer of claim 21, further including a third energizing circuit for each of said motors associated with said first and second throttles, each of said third energizing circuits being electrically connectable in parallel with the first energizing circiut for said motor, an engine-out switch operable to open said first energizing circuit and to close said third energizing circuit to energize said motor to rotate its output shaft and the lever arm affixed thereto thereby couple an input to said mechanical yaw computer and said mechanical power computer to simulate an engine failure, a microswitch included in said third energizing circuit and engageable by said lever arm to open said third energizing circuit when said lever arm has rotated to a predetermined engine-out position.

24. The stationary trainer of claim 23, further including a fourth energizing circuit for each of said motors associated with said first and second throttles for energizing said motor to rotate the lever arm affixed to its output shaft to provide an input to said mechanical yaw computer and said mechanical power computer to simulate feathering the prop on the engine which is simulated to have failed, a feather switch operable by said throttle when the latter is operated to a feather position associated with it to close said fourth energizing circuit, and a fixediy mounted second switch included in said fourth energizing circuit, said second switch having a switch contact disposed to engage said first and second cam surfaces on said cam, said switch contact upon engaging a predetermined one of said first and second cam surfaces opening said fourth energizing circuit for said motor.

25. The stationary trainer of claim 16, wherein said rudder controls comprise a right a left rudder pedal, a compensating rod affixed to and operated by one of said rudder pedals, a rotatably supported lever arm, means coupling said lever arm to said seventh mechanical computer to provide an input thereto from said lever arm, a connecting rod affixed to said lever arm and coupled to said compensating rod, said compensating rod being adapted to rotate said lever arm when said compensating rod is operated by said one of said rudder pedals.

26. The stationary trainer of claim 25, wherein said $V_{mc}$ control includes a reversible motor having an output shaft, a cam fixedly secured to said output shaft having a first and a second cam surface thereon, a pulley rotatably affixed to said output shaft and having a switch affixed thereto, said switch having a first and a second terminal contact and a switch contact which is disposed to slidably engage said cam surfaces on said cam, a first energizing circuit including said switch contact and said first terminal contact for energizing said motor to rotate its output shaft in one direction, a second energizing circuit including said switch contact and said first terminal contact for energizing said motor to rotate its output shaft in one direction, a second energizing circuit including said switch contact and said second terminal contact for energizing said motor to rotate its output shaft in the opposite direction, said switch contact when engaged with said first cam surface closing said first energizing circuit and when engaged with said second cam surface closing said second energizing circuit, clamping means operable to restrict the rotational movement of said lever arm, a lever arm affixed to and rotated by the output shaft of said motor coupled to and adapted to operate said clamping means, said first mechanical computer being coupled to and operable to rotate said pulley to position said switch contact of said switch on one of said first and second cam surfaces on said cam to thereby close one of said first and second energizing circuits for said motor, said compensating rod having means thereon for permitting said compensating rod to be operated when said lever arm is prevented from rotating.

References Cited

UNITED STATES PATENTS

| | | | |
|---|---|---|---|
| 2,409,238 | 10/1946 | Barber | 35—12 |
| 2,485,292 | 10/1949 | Kail | 35—12 |
| 3,378,938 | 4/1968 | Frasca | 35—12 |

EUGENE R. CAPOZIO, Primary Examiner

P. V. WILLIAMS, Assistant Examiner